United States Patent [19]
Li et al.

[11] Patent Number: 5,256,329
[45] Date of Patent: Oct. 26, 1993

[54] 1,1-DICHLORO-1-FLUOROETHANE DEWATERING SYSTEMS

[75] Inventors: Chien C. Li, E. Aurora; Kane D. Cook, Buffalo; Rajat S. Basu, Williamsville, all of N.Y.; Stanley S. Seelig, Carol Stream, Ill.

[73] Assignee: AlliedSignal Inc., Morris Township, Morris County, N.J.

[21] Appl. No.: 799,594

[22] Filed: Nov. 27, 1991

[51] Int. Cl.$^5$ .................. C23G 5/02; B01D 17/05; C09K 3/18
[52] U.S. Cl. ..................... 252/194; 134/40; 252/358; 252/171; 252/DIG. 9; 252/DIG. 17
[58] Field of Search ............... 252/194, 171, DIG. 17, 252/358, DIG. 9; 134/40

[56] References Cited

U.S. PATENT DOCUMENTS

| | | | |
|---|---|---|---|
| 4,182,687 | 1/1980 | Bartlett | 252/194 |
| 4,401,584 | 8/1983 | Tajkowski et al. | |
| 4,438,026 | 3/1984 | Tajkowski | |
| 4,594,177 | 6/1986 | Lantz et al. | 252/194 |
| 4,618,447 | 10/1986 | Seelig | 252/139 |
| 4,655,958 | 4/1987 | Jung et al. | 252/194 |
| 4,689,170 | 8/1987 | Zyhowski et al. | 252/194 |
| 4,724,096 | 2/1988 | Figiel et al. | 252/194 |
| 4,947,881 | 8/1990 | Magid et al. | 134/40 |
| 4,954,290 | 9/1990 | Bartlett et al. | 252/305 |
| 4,988,455 | 1/1991 | Magid et al. | 252/171 |
| 5,137,651 | 8/1992 | Stachura et al. | 252/364 X |
| 5,146,015 | 9/1992 | Li | 252/364 X |
| 5,152,845 | 10/1992 | Li | 134/40 OR |
| 5,158,617 | 10/1992 | Li | 134/40 OR |

FOREIGN PATENT DOCUMENTS 382095 8/1990 European Pat. Off. .
WO90/10096 9/1990 World Int. Prop. O. .

OTHER PUBLICATIONS

Zurer, P. S., "*Producers, Users. Grapple with Realities of CFC Phase out*", C&EN News Jul. 24, 1989.
Patent Abstracts of Japan, Group C0773, vol. 014492, corresponding to JP2204467.
Derwent Abstract Accession No. 90-287853-38 (corresponding to JP2204467).

*Primary Examiner*—Robert L. Stoll
*Assistant Examiner*—Daniel S. Metzmaier
*Attorney, Agent, or Firm*—Melanie L. Brown; Jay P. Friedenson

[57] ABSTRACT

This invention relates to compositions comprising a volatile hydrochlorofluorocarbon such as 1,1-dichloro-1-fluoroethane and demulsifer. The compositions are effective as drying agents.

18 Claims, No Drawings

1,1-DICHLORO-1-FLUOROETHANE DEWATERING SYSTEMS

BACKGROUND OF THE INVENTION

This invention relates to improved surfactant-based 1,1-dichloro-1-fluoroethane drying compositions. More particularly, this invention relates to such compositions which include a volatile solvent component such as 1,1-dichloro-1-fluoroethane and one or more compounds that have the capability of removing water or aqueous films from the surfaces of a broad range of substrates.

Various volatile solvent drying compositions have been used in the past. Illustrative of such compositions are those described in U.S. Pat. Nos. 4,438,026 and 4,401,584 and German Patent No. 3,319,023. These compositions remove water from the substrate to be dried by displacement. Drying in this manner avoids an energy consuming drying step and greatly expedites subsequent processing of the substrate component.

Prior art drying compositions suffer from a number of disadvantages which limit their usefulness. For example, some volatile solvent drying compositions used in the past have often proved less than satisfactory by failing to effectively displace water from the surface to be dried. Also, although some compositions in the past have proven effective to displace water from some substrates such as metal, e.g. stainless steel, aluminum and brass, they have not been practically effective on nonmetallic surfaces, such as glass or ceramic.

An additional and serious problem encountered with varying severity in the use of solvent drying solutions depending on the specific application and substrate to be dried, is the fact that such solutions tend to emulsify or otherwise generate agglomerates and are difficult to purify or to be freed of aqueous impurities so that the drying solution can reused. The presence of emulsions or other non-soluble formations in these drying compositions interferes with the free elimination of water, such as by decantation, and ultimately interrupts the water-displacement process which is the essential objective of the substrate drying treatment.

In some dewatering compositions, the tendency to form emulsions with water is controlled by the incorporation of suitable demulsifiers. While such additives do prevent emulsification, they do not improve the effectiveness of the compositions for dewatering all substrates. Moreover, some of these surfactants have excessive water extract ability which necessitates the addition of more surfactant to the composition on a periodic basis.

The art is continually seeking new fluorocarbon based drying compositions. Currently, fluorocarbon based compositions which are considered to be stratospherically safe substitutes for presently used fully halogenated chlorofluorocarbons are of interest. The latter are suspected of causing environmental problems in connection with the earth's protective ozone layer. Mathematical models have substantiated that hydrochlorofluorocarbons, such as 1,1-dichloro-1-fluoroethane (HCFC-141b), will not adversely affect atmospheric chemistry, being negligible contributors to ozone depletion and to green-house warming in comparison to the fully halogenated species.

SUMMARY OF THE INVENTION

We found that 1,1-dichloro-1-fluoroethane alone is ineffective as a drying agent as shown in Comparative A below. We then found a group of demulsifiers which when combined with 1,1-dichloro-1-fluoroethane provides good drying without the formation of an emulsion. Thus, the present invention provides compositions comprising: (a) one or more volatile hydrochlorofluorocarbons and (b) demulsifier.

The amount of demulsifier required varies depending upon the type used. Preferably, about 250 ppm to about 1 weight percent of demulsifier based on the total weight of solvent is used. More preferably, about 500 ppm to about 5000 ppm of demulsifier based on the weight percent of the solvent is used.

Commonly assigned U.S. Pat. No. 4,618,447 teaches drying compositions of a halocarbon such as 1,1,2-trichloro-1,2,2-trifluoroethane and aromatic quaternary ammonium salts of a phosphate acid ester. The patent teaches that its aromatic quaternary ammonium salts of a phosphate acid ester do not require demulsifiers.

In an attempt to provide additional drying compositions, we added aromatic quaternary ammonium salts of a phosphate acid ester to 1,1-dichloro-1-fluoroethane but an emulsion formed. As is known in the art, the presence of emulsions in drying compositions interferes with the free elimination of water and is unacceptable.

Thus, the present invention also provides a composition which comprises:

(a) one or more volatile organic hydrochlorofluorocarbons;

(b) an "effective amount" of one or more aromatic quaternary ammonium salts of a phosphate acid ester, said salts of the formula:

wherein
$A^+$ is a moiety of the formula:

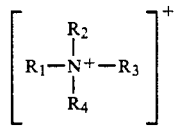

$B^-$ is a moiety of the formula:

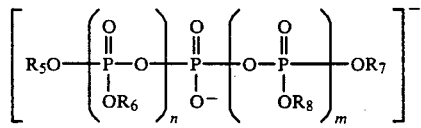

n and m are integers from 0 to about 10, provided that n+m is not greater than 10 and further provided that n+m is equal to or greater than 1, when $R_5$, $R_6$, $R_7$ and $R_8$ are other than aryl, aralkyl or alkylaryl;

$R_1$ is alkyl having from about 1 to about 2 carbon atoms;

$R_2$ is alkyl having from about 8 to about 18 carbon atoms;

$R_3$ is $R_1$, $R_2$;

$R_4$ is $R_1$, $R_2$, aryl, aralkyl or alkaryl; and

R$_5$, R$_6$, R$_7$ and R$_8$ are the same or different at each occurrence and are hydrogen, alkyl having from about 8 to about 18 carbon atoms, aryl, aralkyl or alkaryl;

with the proviso that at least one of R$_4$, R$_5$, R$_6$, R$_7$, and R$_8$ is aryl, aralkyl or alkaryl when n+m is 0, and with the further proviso that at least one of R$_5$, R$_6$, R$_7$, and R$_8$ is other than hydrogen; and (c) demulsifier. These compositions are effective drying agents and do not form emulsions.

The compositions of this invention can be conveniently used in the process of this invention for substantially removing contaminants from the surface of an article. More particularly, the process of this invention comprises the steps of:

(a) contacting the article with a composition of the present invention;

(b) removing the article from contact with said composition; and (c) drying said article so as to effect evaporation of said composition from the surface of said article whereupon said contaminants are substantially removed from said surface of said article.

Other advantages of the invention will become apparent from the following description.

DETAILED DESCRIPTION OF THE PREFERRED EMBODIMENTS

The compositions of this invention include one or more "volatile hydrochlorofluorocarbons". As used herein, a "volatile hydrochlorofluorocarbon" is a hydrochlorofluorocarbon having a boiling point of at least about 25° C. at atmospheric pressure. Preferred hydrochlorofluorocarbons are in Table I below. The most preferred volatile hydrochlorofluorocarbon is 1,1-dichloro-1-fluoroethane.

TABLE I

| CHEMICAL FORMULA | NUMBER | BOILING POINT (°C.) |
|---|---|---|
| CH$_2$ClCFHCH$_3$ | HCFC-253ec | 27.0 |
| CF$_3$CHClCH$_3$ | HCFC-253db | 27.7 |
| CFCl$_2$CH$_3$ | HCFC-141b | 32.0 |
| CHClFCF$_2$CH$_3$ | HCFC-253cb | 37.2 |
| CF$_3$CCl$_2$CH$_3$ | HCFC-243ab | 40.5 |
| CFCl$_2$CF$_2$CH$_3$ | HCFC-243cc | 43.6 |
| CF$_2$HCCl$_2$CH$_3$ | HCFC-243aa | 50.0 |
| CF$_2$ClCFClCH$_3$ | HCFC-243bc | 56.0 |
| CFCl$_2$CF$_2$CH$_3$ | HCFC-243cc | 60.0 |
| CF$_3$CF$_2$CH$_2$Cl | HCFC-253fb | 46.5 |

The amount of volatile hydrochlorofluorocarbon included in the composition can vary widely. Any amounts known to those of skill in the art can be employed, as for example, amounts employed in U.S. Pat. Nos. 4,438,026 and 4,401,584 and German Patent No. 3,319,023.

The quaternary ammonium salts of ortho-and/or polyphosphate acid esters, of the present invention contain at least one aromatic substituent, in either the cationic quaternary ammonium moiety or the ammonium anionic ortho- and/or polyphosphate acid ester moiety. These materials are freely soluble in the volatile hydrochlorofluorocarbon solvents forming substantially homogeneous compositions, and in combination with demulsifiers, can substantially remove organic and inorganic contaminants such as water from a broad range of metallic, glass, ceramic and like substrates.

The composition comprises an effective amount of one or more aromatic quaternary ammonium salts. Effective amount as used herein means an amount which is capable of improving the drying capability of the hydrochlorofluorocarbon solvent to any extent. The amount of aromatic quaternary ammonium salt included in the composition of this invention can vary widely. Usually, the amount of such a salt is not greater than about 5 weight percent based on the total weight of the composition primarily to reduce the amount of salt remaining on the surface. However, while not practical, larger amounts can be used if after treatment with the composition the article being dried is thereafter treated with a volatile hydrochlorofluorocarbon having either no surfactant or small amounts. In the preferred embodiments of the invention, the amount of surfactant is from about 2 to about 0.0001 weight percent based on the total weight of the composition, and in the particularly preferred embodiments, it is from about 1 to about 0.0001 weight percent on the aforementioned basis. Among these particularly preferred embodiments, most preferred are those in which the weight percent of salt is from about to about 0.01 weight percent by weight of the composition.

The quaternary ammonium salts which are useful in the practice of the invention are of the formula:

$$[A^+][B^-]$$

wherein

A$^+$ is a moiety of the formula:

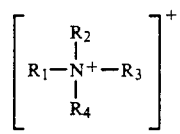

B$^-$ is a moiety of the formula:

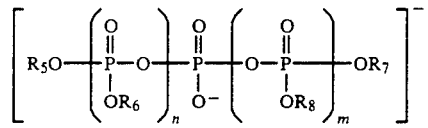

n and m are integers from 0 to about 10, provided that n+m is not greater than 10 and further provided that n+m is equal to or greater than 1, when R$_5$, R$_6$, R$_7$ and R$_8$ are other than aryl, aralkyl or alkylaryl;

R$_1$ is alkyl having from about 1 to about 2 carbon atoms;

R$_2$ is alkyl having from about 8 to about 18 carbon atoms;

R$_3$ is R$_1$ or R$_2$;

R$_4$ is R$_1$, R$_2$, aryl, aryl, aralkyl or alkaryl; and

R$_5$, R$_6$, R$_7$, and R$_8$ are the same or different and are hydrogen, alkyl having from about 8 to about 18 carbon atoms, aryl, aralkyl or alkaryl; with the proviso that at least one of R$_4$, R$_5$, R$_6$, R$_7$, and R$_8$ is aryl, aralkyl or alkaryl, and with the further proviso that at least one of R$_5$, R$_6$, R$_7$, and R$_8$ is other than hydrogen.

Aromatic quaternary ammonium salts and aliphatic quaternary ammonium salts which are useful in the conduct of this invention may be obtained from commercial sources or prepared in accordance with standard procedures. For example, such salts may be prepared by reacting an appropriate ortho- and/or polyphosphate acid ester, such as octylphenyl hydrogen phosphate, with a suitable amine, as for example triethylamine, to prepare the corresponding amine salt of an orthophosphate ester such as triethylamine octylphenyl phosphate. The amine salt of an orthophosphate ester is then reacted with a quaternary ammonium halide such as n-alkyl dimethyl benzyl ammonium chloride to provide the desired aromatic salt such as the n-alkyl dimethyl benzyl ammonium salt of octylphenyl hydrogen phosphate.

We found that the combination of 1,1-dichloro-1-fluoroethane and aromatic quaternary salt of a phosphate acid ester requires the presence of a demulsifier. With a liquid mixture of 1,1-dichloro-1-fluoroethane and salt, an emulsion forms when the liquid mixture goes through its liquid-liquid phase transition. In this region especially close to the consolution point, the interfacial tension is reduced considerably. As a result, the salt behaves as a bilayer absorbent for the nonmiscible components. In this case, water is on one side of the salt and the solvent is on the other side of the salt. Because of such a rigid structural orientation, the interfacial viscosity increases resulting in minimal drainage and leading to emulsion.

In order to break the emulsion, we found that a demulsifier which has the ability of penetrating into the interface to remove one of the adsorbates and which has no affinity toward any one of the components is needed.

Choice of the proper demulsifier is unobvious and depends on the system chosen. Examples of commercially available demulsifiers are in Table II below.

TABLE II

| TRADE-MARK | CHEMICAL FORMULA | SUPPLIER |
|---|---|---|
| COLLOID 843 ® | Nonionic Surfactant Blend | Rhone-Poulenc |
| COLLOID 640 ® | Nonionic Surfactant Blend | Rhone-Poulenc |
| AMEROXOL OE-5 ® | Fatty Alcohol Ethoxylate | Amerchol |
| MERPOL SE ® | Phenolic Nonionic Surfactant | DuPont |
| ZONYL FSO ® | Telomer B Monoether With Polyethylene Glycol | DuPont |
| AF-1400 ® | Fluorinated Polymethyl Siloxane | Dow Corning |
| Surfynol-DF-110L ® | 2, 5, 8, 11-Tetramethyl-6-dodecyl-5, 8-diol dipropylene glycol and ethylene gylcol | Air Products |
| L-24-2 ® | Linear Alcohol Ethoxylate | Texaco |
| L-24-3 ® | Linear Alcohol Ethoxylate | Texaco |

The following compounds are illustrative of aromatic quaternary ammonium salts which can be used in the practice of this invention.

n-Alkyl dimethyl benzyl ammonium salt of octylphenyl hydrogen phosphate;

n-Alkyl dimethyl benzyl ammonium salt of bis (2-ethylhexyl) hydrogen pyrophosphate;

n-Alkyl dimethyl benzyl ammonium salt of bis(n-octylphenyl) hydrogen pyrophosphate;

n-Alkyl dimethyl benzyl ammonium salt of bis(t-butylphenyl) hydrogen pyrophosphate;

Myristyl dimethyl benzyl ammonium salt of bis(2-ethylhexyl) hydrogen pyrophosphate;

Stearyl dimethyl benzyl ammonium salt of bis(2-ethylhexyl) hydrogen pyrophosphate; and n-Alkyl dimethyl naphthyl ammonium salt of bis(2-ethylhexyl) hydrogen pyrophosphate.

Preferred for use in the practice of this invention are aromatic quaternary ammonium salts of a phosphate acid ester of the formula:

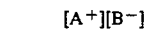

wherein $A^+$ is a moiety of the formula:

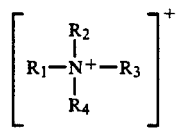

$B^-$ is a moiety of the formula:

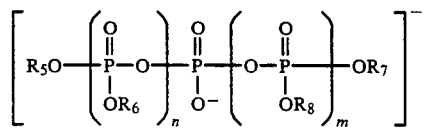

n and m are integers from 0 to about 10 provided that n+m is not greater than 10;

$R_1$ is alkyl having from about 1 to about 2 carbon atoms;

$R_2$ is alkyl having from about 8 to about 18 carbon atoms;

$R_3$ is $R_1$ or $R_2$;

$R_4$ is $R_1$, $R_2$, aryl, aralkyl or alkaryl; and $R_5$, $R_6$, $R_7$ and $R_8$ are the same or different at each occurrence and are hydrogen, alkyl having from about 8 to about 18 carbon atoms, aryl, aralkyl or alkylaryl; with the proviso that at least one of $R_4$, $R_5$, $R_6$, $R_7$ and $R_8$ is aryl, aralkyl or alkaryl, and with the further proviso that at least one of $R_5$, $R_6$, $R_7$ and $R_8$ is other than hydrogen.

Preferred for use in the practice of this invention amongst the above aromatic quaternary ammonium salts are those in which n and m are integers from 0 to about 5, provided that n+m is not greater than 5;

$R_1$ is methyl or ethyl;

$R_2$ is alkyl having from about 12 to about 16 carbon atoms;

$R_3$ is methyl or ethyl;

$R_4$ is aryl, aralkyl or alkaryl; and $R_5$, $R_6$, $R_7$ and $R_8$ are the same or different and are hydrogen, alkyl having from about 8 to about 18 carbon atoms or alkaryl, with the proviso that at least one of $R_5$, $R_6$, $R_7$, and $R_8$ is other than hydrogen.

Particularly preferred for use in the practice of this invention are such salts in which n and m are integers from 0 to about 1, provided that n+m is not greater than 2;

$R_1$ is methyl;

$R_2$ is a mixture of $C_{12}$, $C_{14}$, and $C_{16}$ alkyl groups;

$R_3$ is methyl;

$R_4$ is benzyl or naphthyl; and $R_5$, $R_6$, $R_7$, and $R_8$ are the same or different and are hydrogen, alkyl having about 8 carbon atoms or alkaryl with the proviso that at least one of $R_5$, $R_6$, $R_7$, and $R_8$ is other than hydrogen.

Amongst these particularly preferred embodiments, most preferred are those embodiments in which the composition contains a mixture of salts in which:

n and m are o;
$R_1$ is methyl;
$R_2$ is $C_{12}$, $C_{14}$, or $C_{16}$ alkyl;
$R_3$ is methyl;
$R_4$ is benzyl; and
$R_5$ and $R_6$ are the same or different and are hydrogen or octyl phenyl with the proviso that at least one of $R_5$ and $R_6$ is other than hydrogen.

Also, among the particularly preferred embodiments most preferred are those in which the composition contains a mixture of surfactants in which:

n and m are 0, 1, or 2, provided that n+m is not greater than 3;
$R_1$ is methyl;
$R_2$ is a $C_{12}$, $C_{14}$, or $C_{16}$ alkyl groups;
$R_3$ is $R_1$;
$R_4$ is benzyl; and
$R_5$, $R_6$, $R_7$, and $R_8$ are the same or different and are alkyl having about 8 carbon atoms or hydrogen with the proviso that at least one of $R_5$, $R_6$, $R_7$, and $R_8$ is other than hydrogen.

Especially useful aromatic surfactants for use in the practice of this invention are the n-alkyl dimethyl benzyl ammonium salts of bis-(2-ethylhexyl) hydrogen pyrophosphate and octylphenyl hydrogen phosphate.

The solvent composition of this invention is very effective in displacing water from a broad range of substrates of different compositions. In particular, the compositions of the invention serve to displace water from various common substrates, including metals, such as stainless steel, aluminum alloys, brass and the like; and from glass and ceramic surfaces, such as lime glasses, borosilicate glass, unglazed alumina, silica (as on silicon wafers used in miniaturized electronic circuits), fired alumina and the like. In addition, the compositions of the present invention do not form emulsions with the displaced water. This property is important for practical, efficient water removal by decantation when the drying solvent is used in commercial drying apparatus because, for example, it avoids clogging of equipment and process delays. Moreover, the compositions of the present invention require a minimum of attention or monitoring when being used in a drying machine for long periods of time, and infrequent additions of the surfactant component during use because of low surfactant solubility in water and resistance to chemical attack.

In the method of the present invention, the article is first contacted with a composition of the present invention. Methods of contacting are not critical and may vary widely. For example, the article may be immersed in a container of the composition, or the article may be sprayed with the composition using conventional equipment. Complete immersion of the article is preferred because it generally insures contact between the composition and all exposed surfaces of the article. However, any other method which easily provides such complete contact may be used.

The contacting time may vary widely. Usually, the contacting time is at least about 10 minutes. In the preferred embodiments of the invention, the contacting time is from about 1 to about 5 minutes, and in the particularly preferred embodiments, is from about 1 to about 4 minutes. Amongst these preferred embodiments, most preferred are those embodiments in which the contacting time is from about 1 to about 3 minutes.

Contacting temperatures also may vary widely depending on the boiling point of the hydrochlorofluorocarbon solvent of the composition. In general, the contacting temperature is equal to or less than such boiling point.

After the contacting step, the article is removed from contact with the composition of the present invention and removal of compositions adhering to exposed surfaces of the article is effected by evaporation, by conventional means. In a further embodiment, the remaining minimal amounts of surfactant adhering to exposed surfaces of the article may be further removed by contacting the article with surfactant-free solvent that is hot or cold in order to decrease the presence of surfactant residues remaining on the article. Thus, the surfactant-free solvent may be in vapor or liquid form. In the final step, removal of solvent adhering to exposed surfaces of the article is effected by evaporation.

In general, evaporation of the composition is effected in less than about 30 seconds, and preferably less than about 10 seconds. Neither temperature nor pressure is critical. Atmospheric or subatmospheric pressures may be employed; and temperature above and below the boiling point of the hydrochlorofluorocarbon solvent may be used.

The composition and process of this invention are preferably carried out using conventional drying machines and systems. Illustrative of such drying machines are those described in U.S. Pat. No. 3,386,181.

The present invention is more fully illustrated by the following non-limiting Examples.

COMPARATIVES AND EXAMPLES

To evaluate the performance of various compositions in terms of their ability to displace water from wet substrates and to give good separations between water and solvent phases, the following test methods were used.

"DRYING TEST"

The "Drying Test" measures the efficiency of water displacement performance and is conducted as follows:

(1) A stainless-steel beaker, of about 2-liter capacity, is fitted with a cooling-coil of several turns of tubing that conforms closely to the inner surface of the upper part of the beaker. The coil is connected to a source of cooling fluid. This arrangement is referred to as a "boiling sump".

(2) The boiling sump is charged with 500 ml of the solution to be tested and is placed upon a thermostatted hot plate. The solution is heated to a rolling boil and vapors are refluxed off the surface of the cooling coil.

(3) Specimens, i.e., "coupons" having an approximate size 18 mm × 76 mm (about 0.71 inches by 3 inches), of the substrates to be tested are pre-cleaned to a condition of no-water-break cleanliness (a terminology used by those who work in the field of surface-finishing of metals and other substrates to refer to a surface condition essentially free of oil film). The coupons are attached to suspension means and are wetted with water just prior to the test. The wetted coupon is completely immersed for a pre-determined time in the boiling test solution, e.g., five seconds. It is then raised into the vapor region above the liquid and held there for 30 seconds. The coupon is then removed and examined for the presence of water on the surface. If it is dry, the process is repeated with fresh, wet coupons for confirmation and a dry time of less than five seconds is reported. If the coupon is wet at five seconds, then longer immersion times are used, successively, until complete water-displacement, i.e., a dry surface, is observed. The "drying time" is reported as the immersion times (in seconds) to achieve "dry" surface condition upon removal from the boiling sump. The shorter the time for drying the better the water-displacement efficiency.

Laboratory dewatering test results are in Table III below. The drying cycle was 15 seconds in the boiling solvent and 60 seconds in the vapor. The surfactant concentration was 500 parts per million except that the AF-1400 ® surfactant was 50 parts per million. NP means did not pass. P stands for passed. Al stands for aluminum, Cu stands for copper, and CRS stands for cold rolled steel. DRSC stands for n-alkyldimethyl benzyl ammonium salts of bis-(2-ethylhexyl) hydrogen pyrophosphate and octylphenyl hydrogen phosphate.

Antifoam 1400 ® is abbreviated as AF-1400. Surfonic L-24-3 ® is abbreviated as L-24-3. Surfynol DF-110L ® is abbreviated as DF110L. Surfonic L-24-2 ® is abbreviated as L-24-2.

TABLE III

| C/E | COMPOSITION | Al | Cu | CRS | Glass |
|---|---|---|---|---|---|
| A | 141b | N | N | N | N |
| B | 113 | N | N | N | N |
| C | 113/DRSC | P | P | P | N |
| 1 | 141b/COLLOID 843 ® | P | P | P | P |
| 2 | 141b/COLLOID 640 ® | P | P | P | P |
| 3 | 141b/DRSC/COLLOID 843 ® | P | P | P | P |
| 4 | 141b/DRSC/COLLOID 640 ® | P | P | P | P |
| 5 | 141b/DRSC/AF-1400 | P | P | P | P |
| 6 | 141b/DRSC/L-24-3 | P | P | P | P |
| 7 | 141b/DRSC/DF110L | P | P | P | P |
| 8 | 141b/DRSC/L-24-2 | P | P | P | P |

Machine dewatering test results are in Table IV below. The drying cycle was 15 seconds in the boiling sump, 20 seconds in the rinse sump, and 60 seconds in the vapor. P stands for passed. Al stands for aluminum and CRS stands for cold rolled steel. DRSC is as defined above.

TABLE IV

| EX | COMPOSITION | CERAMIC | CRS | Al |
|---|---|---|---|---|
| 9 | 141b/DRSC/COLLOID 843 ® | P | P | P |
| 10 | 141b/COLLOID 843 ® | P | P | P |

"PHASE-SEPARATION TEST"

The phase-separation test simulates the agitation imparted to a liquid by the boiling action in the sumps on a vapor-phase degreasing machine. This test also measures the relative rates of separation for aqueous and solvent phase after the end of the agitation period. The more rapid and complete the separation of the phases, the more potentially useful is the solvent-surfactant composition in a drying machine. The "Phase Separation Test" is conducted as follows.

Solvent and surfactant are mixed in a glass bottle and shaken for a period of time and allowed to sit. Phase separation of water and organic phase was observed.

Having described the invention in detail and by reference to preferred embodiments thereof, it will be apparent that modifications and variations are possible without departing from the scope of the invention defined in the appended claims.

What is claimed is:
1. A composition comprising:
(a) one or more volatile hydrochlorofluorocarbons selected from the group consisting of 1-chloro-1,1,2-trifluoropropane; 2-chloro-1,1-difluoropropane; 1,1-dichloro-1-fluoroethane; 1-chloro-1,2,2-trifluoropropane; 2,2-dichloro-1,1,1-trifluoropropane; 1,1-dichloro-1,2,2-trifluoropropane; 2,2-dichloro-1,1,3-trifluoropropane 1,2-dichloro-1,1,2-trifluoropropane; and 1,1-dichloro-1,2,2-trifluoropropane; and

(b) demulsifier wherein said demulsifier is selected from the group consisting of nonionic surfactant, fatty alcohol ethoxylate; telomer B monoether with polyethylene glycol; fluorinated polymethyl siloxane; and 2,5,8,11-tetramethyl-6-dodecyl-5,8-diol dipropylene glycol and ethylene glycol.

2. The composition of claim 1 wherein said volatile hydrochlorofluorocarbon is 1,1-dichloro-1-fluoroethane.

3. A composition which comprises:
(a) one or more volatile hydrochlorofluorocarbons selected from the group consisting of 1-chloro-1,1,2-trifluoropropane; 2-chloro-1,1,1-trifluoropropane; 2-chloro-1,1,1-trifluoropropane; 1,1-dichloro-1-fluoroethane; 1-chloro-1,2,2-trichloropropane; 1,1-dichloro-1,2,2-trifluoropropane; 2,2-dichloro-1,1,3-trifluoropropane; 1,2-dichloro-1,1,2-trifluoropropane; and 1,1-dichloro-1,2,2-trifluoropropane;

(b) an effective amount for improving drying capability of said hydrochlorofluorocarbon on one or more aromatic quaternary ammonium salts of a phosphate acid ester of the formula:

$[A^+][B^-]$ wherein
$A^+$ is moiety of the formula:

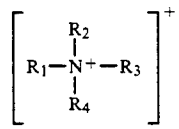

$B^-$ is moiety of the formula:

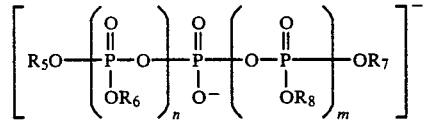

n and m are integers from 0 to about 10, provided that n+m is not greater than 10 and further provided than n+m is equal to or greater than 1 when $R_5$, $R_6$, $R_7$, and $R_8$ are other than aryl, aralkyl or alkylaryl;
$R_1$ is alkyl having from about 1 to about 2 carbon atoms;
$R_2$ is alkyl having from about 8 to about 18 carbon atoms;
$R_3$ is $R_1$ or $R_2$;
$R_4$ is $R_1$, $R_2$, aryl, aryl, aralkyl or alkaryl; and
$R_5$, $R_6$, $R_7$, and $R_8$ the same or different at each occurrence and are hydrogen, alkyl having from about 8 to about 18 carbon atoms, aryl, aralkyl or alkaryl; with the proviso that at least one of $R_4$, $R_5$, $R_6$, $R_7$, and $R_8$ is aryl, aralkyl or alkaryl when n+m is 0, and with the further proviso that at least one of $R_5$, $R_6$, $R_7$, and $R_8$ is other than hydrogen; and (c) demulsifier wherein said demulsifier is selected from the group consisting of fatty alcohol ethoxylate; telomer B monoether with polyethylene glycol; fluorinated polymethyl siloxane; and 2,5,8,11-tetramethyl-6-dodecyl-5,8-diol dipropylene glycol and ethylene glycol.

4. The composition of claim 3 which comprises an effective amount of one or more aromatic quaternary ammonium salts of a phosphate acid ester of the formula:

$$[A^+][B^-]$$

wherein $A^{+60}$ is a moiety of the formula:

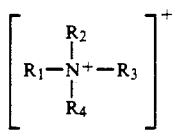

$B^-$ is a moiety of the formula:

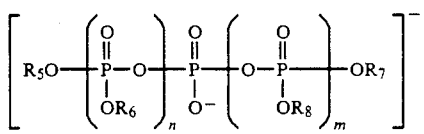

n and m are integers from 0 to about 10 provided that n+m is not greater than 10;

$R_1$ is alkyl having from about 1 to about 2 carbon atoms;

$R_2$ is alkyl having from about 8 to about 18 carbon atoms;

$R_3$ is $R_1$ or $R_2$;

$R_4$ is $R_1$, $R_2$, aryl, aryl, aralkyl or alkaryl; and $R_5$, $R_6$, $R_7$, and $R_8$ are the same or different at each occurrence and are hydrogen, alkyl having from about 8 to about 18 carbon atoms, aryl, aralkyl or alkaryl; with the proviso that at least one of $R_4$, $R_5$, $R_6$, $R_7$ and $R_8$ is aryl, aralkyl or alkaryl, and with the further proviso that at least one of $R_5$, $R_6$, $R_7$, and $R_8$ is other than hydrogen.

5. The composition of claim 3 wherein said hydrochlorofluorocarbon is 1,1-dichloro-1-fluoroethane.

6. The composition of claim 3 wherein
n and m are integers from about0 to about 5, provided that m+n is not greater than 5;
$R_1$ and $R_3$ are the same of different and are methyl or ethyl;
$R_2$ is alkyl having from about 12 to about 16 carbon atoms,
$R_4$ is aryl, aralkyl or alkylaryl; and
$R_5$, $R_6$, and $R_8$ are the same or different and are hydrogen, alkyl having from about 8 to about 18 carbon atoms or alkaryl, with the proviso that at least one of $R_5$, $R_6$, $R_7$ and $R_8$ is other than hydrogen.

7. The composition of claim 3 wherein n and m are 0.

8. The composition of claim 3 wherein:
$R_5$ and $R_7$ are the same or different and are hydrogen or octylphenyl; and
$R_6$ and $R_8$ are $R_7$.

9. The composition of claim 3 wherein said composition comprises a mixture of quaternary ammonium salts in which $R_2$ is a mixture of alkyls having 12, 14 and 16 carbon atoms.

10. The composition of claim 3 which contains a mixture of quaternary ammonium salts in which:
n and m are integers from 0 to about 1, provided that n+m is greater than 2:
$R_1$ is methyl;
$R_2$ is $C_{12}$, $C_{14}$, or $C_{16}$ alkyl;
$R_3$ is $R_1$;
$R_4$ is benzyl or naphthyl;
$R_5$ is hydrogen; and
$R_6$, $R_7$, and $R_8$ are the same and are alkyl having about 8 carbon atoms or alkaryl.

11. The composition of claim 3 which contains a mixture of quaternary ammonium salts in which:
n and m are 0, 1 or 2, provided that n+m is not greater than 3;
$R_1$ and $R_3$ are methyl;
$R_2$ is a mixture of $C_{12}$, $C_{14}$, $C_{16}$ alkyl moieties;
$R_4$ is benzyl; and
$R_5$, $R_6$, $R_7$ and $R_8$ are the same or different and are alkyl having about 8 carbons or hydrogen with the proviso that at least one of $R_5$, $R_6$, $R_7$, and $R_8$ is other than hydrogen.

12. The composition of claim 3 wherein said salts are selected from the group consisting of n-alkyl dimethyl benzyl ammonium salts of bis-(2-ethylhexyl) hydrogen pyrophosphate and octylphenyl hydrogen phosphate.

13. The composition of claim 3 wherein said composition comprises not more than about 5 weight percent of said salts based on the total weight of the composition.

14. The composition of claim 3 which contains a mixture of quaternary ammonium salts in which:
n and m are 0;
$R_1$ is methyl
$R_2$ is $C_{12}$, $C_{14}$ or $C_{16}$ alkyl;
$R_3$ is $R_1$;
$R_4$ is benzyl;
$R_5$ and $R_7$ are same or different and are hydrogen or octylphenyl.

15. A process of substantially removing contaminants from the surface of an article comprising the steps of:
(a) immersing the article in said composition of claim 1;
(b) removing the article from said composition; and
(c) drying said article so as to effect evaporation of said composition from the surface of said article whereupon said contaminants are substantially removed from said surface of said article.

16. A process of substantially removing contaminants from the surface of an article comprising the steps of:
(a) immersing the article in said composition of claim 1;
(b) removing the article from said composition;
(c) contacting the article with hot or cold solvent without surfactant present;
(d) removing the article from contact with said solvent of step (c); and
(e) drying said article so as to effect evaporation of said composition of step (a) and said solvent of step (d) whereupon said contaminants are substantially removed from said surface of said article.

17. A process of substantially removing contaminants from the surface of an article comprising the steps of:
(a) immersing the article in said composition of claim 3;
(b) removing the article from said composition; and
(c) drying said article so as to effect evaporation of said composition from the surface of said article whereupon said contaminants are substantially removed from said surface of said article.

18. A process of substantially removing contaminants from the surface of an article comprising the steps of:
(a) immersing the article in said composition of claim 3;
(b) removing the article from said composition;
(c) contacting the article with hot or cold solvent without surfactant present;
(d) removing the article from contact with said solvent of step (c); and
(e) drying said article so as to effect evaporation of said composition of step (a) and said solvent of step (d) whereupon said contaminants are substantially removed from said surface of said article.

* * * * *

UNITED STATES PATENT AND TRADEMARK OFFICE
CERTIFICATE OF CORRECTION

PATENT NO. : 5,256,329
DATED : October 26, 1993
INVENTOR(S) : C. Li, K. Cook, R. Basu and S. Seelig It is certified that error appears in the above-identified patent and that said Letters Patent is hereby corrected as shown below:

Column 10, claim 1, should read as follows:

1. A composition comprising:

(a) one or more volatile hydrochlorofluorocarbons selected from the group consisting of 1-chloro-1,1,2-trifluoropropane; 2-chloro-1,1-difluoropropane; 1,1-dichloro-1-fluoroethane; 1-chloro-1,2,2-trifluoropropane; 2,2-dichloro-1,1,1-trifluoropropane; 1,1-dichloro-1,2,2-trifluoropropane; 2,2-dichloro-1,1,3-trifluoropropane; 1,2-dichloro-1,1,2-trifluoropropane; and 1,1-dichloro-1,2,2-trifluoropropane; and
(b) demulsifier wherein said demulsifier is selected from the group consisting of fatty alcohol ethyoxylate; telomer
B monoether with polyethylene glycol; fluorinated polymethyl siloxane; and 2,5,8,11-tetramethyl-6-dodecyl-5,8-diol dipropylene glycol and ethylene glycol.

Signed and Sealed this

Sixth Day of September, 1994

Attest:

BRUCE LEHMAN

Attesting Officer     Commissioner of Patents and Trademarks